(12) United States Patent
Martin

(10) Patent No.: US 11,402,821 B2
(45) Date of Patent: Aug. 2, 2022

(54) METHOD FOR ASCERTAINING A ROUGH TRAJECTORY FROM A SPECIFIED CONTOUR

(71) Applicant: KEBA INDUSTRIAL AUTOMATION GERMANY GMBH, Lahnau (DE)

(72) Inventor: Frank Martin, Lahnau (DE)

(73) Assignee: KEBA Industrial Automation GmbH, Lahnau (DE)

( * ) Notice: Subject to any disclaimer, the term of this patent is extended or adjusted under 35 U.S.C. 154(b) by 0 days.

(21) Appl. No.: 17/260,172

(22) PCT Filed: Jun. 24, 2019

(86) PCT No.: PCT/EP2019/066605
§ 371 (c)(1),
(2) Date: Jan. 13, 2021

(87) PCT Pub. No.: WO2020/015952
PCT Pub. Date: Jan. 23, 2020

(65) Prior Publication Data
US 2021/0325850 A1 Oct. 21, 2021

(30) Foreign Application Priority Data
Jul. 17, 2018 (DE) ...................... 10 2018 117 245.1

(51) Int. Cl.
*G05B 19/4103* (2006.01)
(52) U.S. Cl.
CPC ............... *G05B 19/4103* (2013.01); *G05B 2219/34098* (2013.01); *G05B 2219/34156* (2013.01)
(58) Field of Classification Search
CPC ...... G05B 19/4103; G05B 2219/34098; G05B 2219/34156; G05B 2219/42209; G05B 2219/49284
See application file for complete search history.

(56) References Cited

U.S. PATENT DOCUMENTS

| | | | |
|---|---|---|---|
| 2012/0016514 A1* | 1/2012 | Nakamura | G05B 19/4103 700/188 |
| 2013/0218323 A1* | 8/2013 | Otsuki | G05B 19/4103 700/187 |
| 2019/0101888 A1* | 4/2019 | Konishi | G05B 19/19 |

FOREIGN PATENT DOCUMENTS

| DE | 103 55 614 B4 | 11/2003 |
|---|---|---|
| EP | 0 594 699 B1 | 7/1992 |

(Continued)

OTHER PUBLICATIONS

International Search Report and Written Opinion of International Application No. PCT/EP2019/066605, dated Jan. 23, 2020.

(Continued)

*Primary Examiner* — Kenneth M Lo
*Assistant Examiner* — Mohammed Shafayet
(74) *Attorney, Agent, or Firm* — Dinsmore & Shohl LLP

(57) ABSTRACT

The invention relates to a method for ascertaining a rough trajectory from a specified contour for controlling a machine tool which has at least two mutually redundant drive devices for carrying out superimposed movements, wherein the contour is determined by a contour function $(P_j, p_j)$ which is defined in portions by contour nodal points $P_0$-$P_{n+1}$ and respective contour portion functions $p_0$-$p_n$, wherein a respective contour portion function $p_j$ connects two adjacent contour nodal points $P_j$, $P_{j+1}$, wherein the rough trajectory is determined by a rough trajectory function $(Q_j, q_j)$ which is defined in portions by rough trajectory nodal points $Q_0$-$Q_{n+1}$ and respective rough trajectory portion functions $q_0$-$q_n$, wherein a respective rough trajectory portion function q connects two adjacent rough trajectory nodal points $Q_j$, $Q_{j+1}$, wherein, for each contour nodal point $P_j$, a respective assigned rough trajectory nodal point $Q_j$ is ascertained in such a manner that a difference in the gradients of the two adjacent rough trajectory portion functions $q_{j-1}$, $q_j$ which (Continued)

Figure 1:
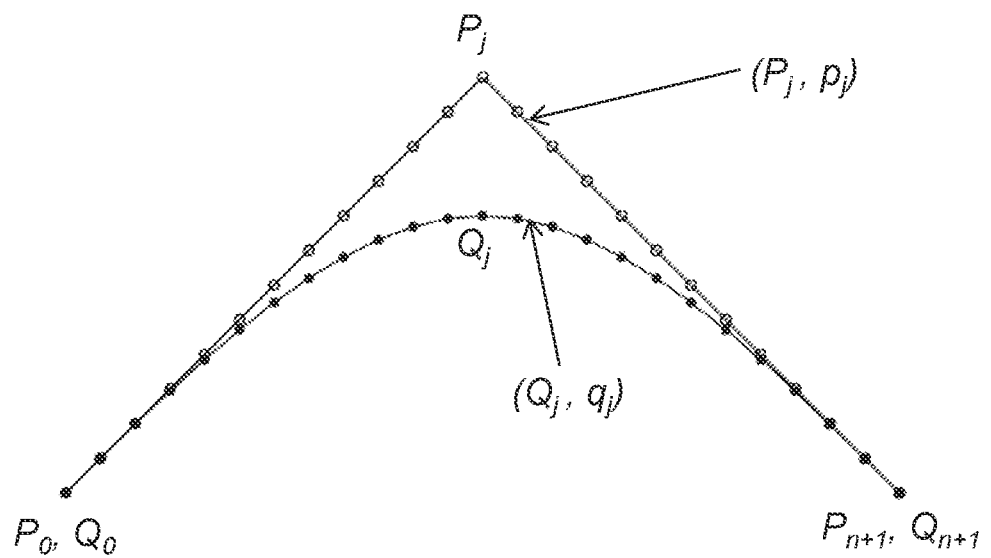

contain this rough trajectory nodal point $Q_j$ is minimal and that the distance of the contour nodal point $P_j$ from the rough trajectory nodal point $Q_j$ satisfies a specified distance condition.

22 Claims, 3 Drawing Sheets

(56) References Cited

FOREIGN PATENT DOCUMENTS

| EP | 1 963 935 B1 | 12/2006 |
|---|---|---|
| JP | 2005118995 A | 5/2005 |
| JP | 2009521028 A | 5/2009 |

OTHER PUBLICATIONS

Bock, Marco Dipl. Math.; "Control of machine tools with redundant axes"; Aug. 2020, Dissertation.
Japanese Office Action corresponding to Japanese Patent App. No. 2021-524104 dated Mar. 9, 2022.

\* cited by examiner

METHOD FOR ASCERTAINING A ROUGH TRAJECTORY FROM A SPECIFIED CONTOUR

CROSS REFERENCE TO RELATED APPLICATION

The present application is a National Phase Entry of International Application No. PCT/EP2019/066605, entitled "METHOD FOR DETERMINING A ROUGH TRAJECTORY FROM A PREDETERMINED CONTOUR" and filed on Jun. 24, 2019 and claims priority to German Application No. 102018117245.1, filed Jul. 17, 2018, each of which is incorporated by reference herein in its entirety.

The present invention relates to a method for ascertaining a rough trajectory from a specified contour for controlling a machine tool which has at least two mutually redundant drive devices for carrying out superimposed movements.

BACKGROUND OF THE INVENTION

Such machine tools are used for example in milling, laser cutting, water-jet cutting or engraving wood, metal or plastics workpieces or as drafting machines (plotters) in order to be able to produce workpieces or drawing lines having a specified two- or three-dimensional contour. A stationary or also a moving, in particular rotating, tool may be moved with the assistance of the drive devices along the specified contour, such that once machining is complete the workpiece has a desired final contour.

Depending on the course of the desired final contour, the tool often has to cover relatively large distances within a short time and is consequently also exposed to severe acceleration and/or deceleration forces. Machine tools which have just a single drive device for each desired direction of movement of the tool rapidly reach their limits of performance in this respect. The speed of machining often has to be reduced to below an acceptable level in order to remain within the speed and/or acceleration limits of the drive device.

This is avoided by using what are known as redundant drive devices for each direction of movement of the machine tool. To this end, a low-dynamic drive is provided which is capable of moving over relatively large displacements but, due to its relatively high mass, has only low motion dynamics. In addition, a second, high-dynamic drive is provided which, on the one hand, can be displaced by means of the low-dynamic drive and, on the other hand, is capable is displacing the tool at high speed and high acceleration or deceleration, wherein however the maximum displacement of the high-dynamic drive device is generally limited.

In order to be able to control such a machine tool with redundant drive devices for a respective direction of movement, it is conventional to divide the contour with which the workpiece is to be machined into a rough trajectory and a fine trajectory. The low-dynamic drive is here controlled with the rough trajectory data while the high-dynamic drive is simultaneously controlled with the fine trajectory data.

Dividing the contour into a rough trajectory and a fine trajectory and corresponding control of the machine tool is in principle known and is described for example in DE 10355614 B4 and EP 0594699 B1. When calculating the rough trajectory, at least the limited displacement of the high-dynamic drive must be taken into account since the workpiece would otherwise be incorrectly machined. Further limiting parameters are advantageously also taken into account in calculating the trajectory. This generally results in the rough trajectory comprising somewhat low-frequency motion components while the fine trajectory has high-frequency motion components. In general, the rough trajectory and the fine trajectory are calculated such that a rough trajectory is ascertained and then the fine trajectory is determined by subtracting the rough trajectory from the contour.

EP 1963935 B1 describes a further method for ascertaining for rough trajectory which is to be travelled in positionally guided manner. An initial trajectory to be travelled is here specified to a computer, wherein the initial trajectory is described by an initial function such that a corresponding position on the initial trajectory is in each case determined by inserting a scalar trajectory parameter into the initial function, wherein the scalar trajectory parameter is other than time and is characteristic of a path travelled along the initial trajectory. The computer subjects the initial trajectory to filtering with a low-pass characteristic as a function of the scalar trajectory parameter and in this manner ascertains a rough function, such that a corresponding position on the rough trajectory is in each case determined by inserting the scalar trajectory parameter into the rough function. The low-pass characteristic here relates to the scalar trajectory parameter. The computer ascertains the rough function such that the distance of the rough trajectory from the initial trajectory is always below a predetermined bound irrespective of the value of the scalar trajectory parameter.

In other words, EP 1963935 B1 proposes a method for calculating a rough function for travel by a low-dynamic drive which is calculated such that an initial trajectory dependent on a travel parameter is filtered in relation to this travel parameter. The low-pass filtered function is checked as to whether a distance of this function from the initial trajectory is below a predetermined bound over the entire range of the travel parameter. On the basis of the low-pass filtered function, further approximations may optionally gradually be carried out in order to ascertain the rough trajectory providing that the above-stated bound is observed.

The doctoral thesis "Steuerung von Werkzeugmaschinen mit redundanten Achsen" [control of machine tools with redundant axes] by Mr. Marco Bock of the faculty of mathematics and computer science, physics and geography at Justus Liebig University Gießen submitted in August 2010 (http://geb.uni-giessen.de/geb/volltexte/2011/7970/pdf/BockMarco_2010_11_19.pdf) describes various further methods for ascertaining a rough trajectory from a specified contour for controlling a machine tool.

According to a first exemplary embodiment, the rough function may be ascertained by initially ascertaining first characteristic intermediate vectors with control points of a spline representation of the initial trajectory. On this basis, second characteristic intermediate vectors which contain control points and define a second intermediate trajectory may be ascertained from the first characteristic intermediate vectors of the spline representation. The control points may be ascertained by weighted or unweighted averaging of pairs of immediately successive intermediate vectors of the first sequence. On this basis, third intermediate vectors may be calculated in corresponding manner. After this double determination of the intermediate trajectory, it must then be ascertained whether a geometric distance of the intermediate trajectory as a rough function from the initial trajectory is below the specified bound along the trajectory parameter. The spline vectors of the initial trajectory may to this end be compared with the spline vectors of the intermediate trajectory of the rough function, wherein the maximum value of these distances provides an upper distance limit which may in turn be compared with the bound for observance of the specified criterion.

In a second exemplary embodiment, respective trajectory positions on the initial trajectory may be ascertained for a plurality of scalar values of the trajectory parameter on the basis of a spline representation of the initial trajectory. On the basis of these pairs of values, a first intermediate trajectory is defined by the above-stated sampling. A second intermediate trajectory of the rough function within the interval of the scalar trajectory parameter may be determined by weighted or unweighted averaging of the positions on the first intermediate trajectory. The second intermediate trajectory may be compared with regard to observance of the bound with the initial trajectory or with the first sampled intermediate trajectory taking account of an auxiliary bound.

Depending on the specified contour, it may happen that known trajectory division methods are incapable of supplying satisfactory results. Under certain circumstances, known methods may be highly computationally intensive and require a correspondingly long computing time. It is also conceivable for the machining time arising from trajectory division not to correspond to the physical capabilities of the machine tool and thus to be extended.

The problem addressed by the invention is therefore that of providing a method of the initially stated kind which is improved in comparison with known methods.

SUMMARY OF THE INVENTION

The problem is solved by a method having the features of claim 1. Advantageous developments of the method are indicated in the dependent claims.

A method is proposed for ascertaining a rough trajectory from a specified contour for controlling a machine tool which has at least two mutually redundant drive devices for carrying out superimposed movements, wherein the contour is determined by a contour function $(P_j, p_j)$ which is defined in portions by contour nodal points $P_0$ to $P_{n+1}$ and respective contour portion functions $p_0$ to $p_n$, wherein a respective contour portion function $p_j$ connects two adjacent contour nodal points $P_j$, $P_{j+1}$, wherein the rough trajectory is determined by a rough trajectory function $(Q_j, q_j)$ which is defined in portions by rough trajectory nodal points $Q_0$ to $Q_{n+1}$ and respective rough trajectory portion functions $q_0$ to $q_n$, wherein a respective rough trajectory portion function $q_j$ connects two adjacent rough trajectory nodal points $Q_j$, $Q_{j+1}$, wherein, for each contour nodal point $P_j$, a respective assigned rough trajectory nodal point $Q_j$ is ascertained in such a manner that a difference in the gradients, in particular a magnitude of the difference in the gradients, of the two adjacent rough trajectory portion functions $q_{j-1}$, $q_j$ which contain this rough trajectory nodal point $Q_j$ is minimal and that the distance of the contour nodal point $P_j$ from the rough trajectory nodal point $Q_j$ satisfies a specified distance condition.

The contour nodal points $P_j$ are two- or three-dimensional sampling points $(x_j, y_j)$ or $(x_j, y_j, z_j)$ which reproduce the specified contour for j=0 to n+1. The two-dimensional case, which may also be transferred into three dimensions, is considered below.

The proposed method can be carried out with little computational effort. It yields a rough trajectory function which is very smooth and, thanks to the minimised gradient change in the rough trajectory nodal points, allows the low-dynamic drive device to be driven at the highest possible speed and in particular with low acceleration or deceleration values and little jerkiness. The specified distance condition here provides a constraint for the optimisation problem to be solved and ensures that the distance between the rough trajectory and the original contour remains within specified limits.

In contrast with the prior art, the method according to the invention does not involve low-pass filtering by weighted or unweighted averaging of individual values. In addition, checking as to whether the distance of the rough trajectory from the contour is always below a predetermined bound independently of a value of a scalar trajectory parameter is not provided and is also not necessary since a corresponding check is already inherently provided by a specified distance condition which underlies the mathematical optimisation as a constraint.

It should be noted at this point that the stated contour which provides the basis for trajectory division according to the invention need not necessarily be the final contour of the workpiece to be machined. It is here optionally also possible to take account of material removal, for example brought about by the tool. For example, account may be taken of the diameter of the milling head when a milling cutter is used.

Advantageously, the specified distance condition requires that the distance between the contour nodal point $P_j$ and the assigned rough trajectory nodal point $Q_j$ is less than or equal to a predetermined limit value $\Delta$. This constitutes a specific development of the constraint explained above for solving the optimisation problem.

The predetermined limit value $\Delta$ is appropriately based on the displacement of the high-dynamic drive device.

According to an advantageous development, the contour function $(P_j, p_j)$ is defined in a plurality of dimensions, wherein the distance condition, according to which the distance between the contour nodal point $P_j$ and the assigned rough trajectory nodal point $Q_j$ is less than or equal to a predetermined limit value $\Delta$, requires that, in each dimension, the distance be less than or equal to a predetermined limit value $\Delta$ for this dimension, wherein in particular the limit values $\Delta$ are equal for all dimensions. Ascertaining the rough trajectory nodal points may be further simplified as a consequence since each dimension can be handled separately.

According to a further advantageous development, ascertaining the respective assigned rough trajectory nodal point $Q_j$ for each contour nodal point $P_j$ requires that those rough trajectory nodal points $Q_j$ for which the sum of all the squared differences between the gradients of two in each case adjacent rough trajectory portion functions $q_{j-1}$, $q_j$ of the rough trajectory function $(Q_j, q_j)$ is minimal are ascertained. This optimisation provides particularly good results in terms of a maximally smooth gradient profile of the rough trajectory function $(Q_j, q_j)$. This optimisation problem may straightforwardly be reformulated as a matrix representation and is then denoted a quadratic problem or quadratic program. Suitable solution methods, in particular numerical solution methods for such an optimisation problem are familiar to a person skilled in the art and examples are set out below.

Advantageously, the contour function $(P_j, p_j)$ is defined in a plurality of dimensions, wherein ascertaining those rough trajectory nodal points $Q_j$ for which the sum of all the squared differences between the gradients of two in each case adjacent rough trajectory portion functions $q_{j-1}$, $q_j$ of the rough trajectory function $Q_j$, $q_j$ is minimal requires that the coordinates of the rough trajectory nodal points $Q_j$ are separately ascertained in each dimension. The stated sum to be minimised is accordingly likewise considered separately for each dimension. This consequently further reduces computational effort.

According to an advantageous development, the rough trajectory portion functions $q_0$ to $q_n$ are formed by respective linear functions. In other words, the rough trajectory nodal points $Q_0$ to $Q_{n+1}$ are in each case connected by straight lines. As a result, no complex interpolation steps are required, which means that the computing time required for generating the rough trajectory can be distinctly reduced.

Alternatively, it is however also possible to generate the rough trajectory portion functions $q_0$ to $q_n$ by means of a spline interpolation of the rough trajectory nodal points $Q_0$ to $Q_{n+1}$. A still smoother course of the rough trajectory and thus still less jerky operation of the drive devices may be achieved as a consequence.

A rough trajectory may generally be ascertained from the overall contour by one-off application of the method. In many cases, however, the course of the contour only known in portions and the further course to the end of the contour is still unknown to the method or the number of contour points $P_j$ is too large for rapid application of the method. It is advantageously proposed to this end to apply the method iteratively, such that a rough trajectory may be ascertained in portions in relation to the contour. Accordingly, in an advantageous further development of the method for ascertaining the rough trajectory, a first rough trajectory portion of rough trajectory nodal points $Q_0$ to $Q_{n0+1}$ and respective rough trajectory portion functions $q_0$ to $q_{n0}$ may be determined from contour points $P_0$ to $P_{n0+1}$, with n0<n and k=0. The furthest distant $P_{n0+1}$ is here obtained from the distance norm $\|P_{n0+1}-P_0\|_\infty > 2\Delta$. Distance $\Delta$ may be for example a maximum (unidirectional) displacement of a drive device, preferably of the high-dynamic drive device. Thereafter, further rough trajectory portions of rough trajectory nodal points $Q_k$ to $Q_{nk+1}$ and respective rough trajectory portion functions $q_k$ to $q_{nk}$ with nk=k+1, . . . , n and k<n may be determined in subsequent iterations with k>0 with regard to the distance condition $2\Delta$ between points $P_k$ and $P_{nk+1}$, i.e. $\|P_{nk+1}-P_k\|_\infty > 2\Delta$. The iterations are carried out until nk=n.

At least the rough trajectory point $Q_k$, preferably at least the two rough trajectory points $Q_{k-1}$, $Q_k$ of the preceding rough trajectory portion, may advantageously be set as the starting point for a subsequent iteration, wherein contour points $P_{k+1}$ to $P_{nk+1}$ are otherwise considered.

In this manner, a contour may be converted into a rough trajectory in portions. For a first contour portion $P_0$ to $P_{n0+1}$, the method is applied from index point 0 up to an index point n0 which is defined by the distance condition that the starting and end points $P_0$ and $P_{n0+1}$ do not exceed a distance limit $2\Delta$. For a subsequent rough trajectory portion, a new starting value k<nk may be used as the starting value and, on the basis of point $P_k$, a point $P_{nk}$ maximally distant therefrom which satisfies the distance condition $2\Delta$ may in turn be defined. At least the rough trajectory point $Q_k$, in particular the two points $Q_{k-1}$, $Q_k$ of the preceding rough trajectory portion, is/are used as the starting point for the subsequent iteration. Jumps on transition from one rough trajectory portion to the next may consequently be avoided and the gradient in the transitional zone minimised.

The preceding method involves building up the rough trajectory in portions. It has proven advantageous for iterative calculation of rough trajectory portion functions of the further rough trajectory portion(s) of the index k to be shifted by one index value and thus k:=k+1 applies for a subsequent iteration. The window of the rough trajectory portion to be calculated is consequently shifted just by the distance of a contour point $P_j$. Rough trajectory points $Q_0$ to $Q_{n0+1}$ are thus initially calculated, wherein according to the distance condition the index value n0 with $\|P_{n0+1}-P_0\|_\infty > 2\Delta$ is obtained, i.e. the smallest possible index value n0 is found, such that the contour point $P_{n0+1}$ is at a distance from the starting point $P_0$ which is just larger than $2\Delta$. In the next iteration, rough trajectory points $Q_1$ to $Q_{n1}$ etc. are ascertained, wherein the index value n1 is in turn obtained from the distance condition $\|P_{n1+1}-P_1\|_\infty > 2\Delta$. $Q_0$ and $Q_1$ of the first rough trajectory portion are here advantageously used as starting values for the second iteration instead of points $P_0$ and $P_1$. Thus, just one or more further contour points $P_j$ of the original course of the contour are newly added for the next rough trajectory portion and the first point or points $Q_0$ and $Q_1$ of the preceding iteration are included. The previously calculated rough trajectory points $Q_{k-1}$ and $Q_k$ thus define the starting points of the rough trajectory portion of the subsequent iteration and the method is continued until nk=n. Shifting each further rough trajectory portion by 1 has proven to be optimal for the determination of the rough trajectory function.

DRAWINGS

Further advantages are revealed by the drawings and the associated description of the drawings. The drawings show exemplary embodiments of the invention. The drawings, description and claims contain numerous features in combination. A person skilled in the art will expediently also consider these features individually and combine them into meaningful further combinations.

In the figures:

FIGS. 1-4 show schematic diagrams of a specified contour and an associated rough trajectory ascertained by means of the method according to the invention.

The method according to the invention is described below by way of example on the basis of a trajectory division of a two-dimensional contour which is defined in an (X, Y) plane, wherein generalisation to other dimensions is, of course, possible. Trajectory division proceeds for example for a machine tool which has two redundant drive devices for each direction of movement. The contour may be described, for example, by first, third or fifth order splines, as is conventional for the operation CNC machine tools. Other contour descriptions may, however, also be available.

The starting point is a contour which is defined at least by contour nodal points $P_j=(x_j^0, y_j^0)$, j=0, . . . , n+1 in a plane (X, Y).

A length $s_j$ between two adjacent contour nodal points $P_j$, $P_{j+1}$ is defined by:

$$s_j = \|P_{j+1}-P_j\|_2 = \sqrt{(x_{j+1}^0-x_j^0)^2+(y_{j+1}^0-y_j^0)^2}, j=0,\ldots,n$$

For simplification, it is assumed that two adjacent contour nodal points $P_j$, $P_{j+1}$ are connected by straight lines with gradients:

$$dx_j^0 = \frac{x_{j+1}^0 - x_j^0}{s_j}, j = 0, \ldots, n$$

$$dy_j^0 = \frac{y_{j+1}^0 - y_j^0}{s_j}, j = 0, \ldots, n$$

This contour is now divided by a rough trajectory function $(Q_j, q_j)$ for controlling a low-dynamic drive device, which function is defined by rough trajectory nodal points $Q_j=(x_j, x_y)$, j=0, . . . , n+1 and rough trajectory portion functions connecting the rough trajectory nodal points $Q_j$, $\square$, $\square=0, \ldots, \square$, having a smooth course and therefore a high advance speed with low acceleration and deceleration values and little jerkiness. Achieving this means that the difference in gradient of two adjacent rough trajectory portion functions $q_{j-1}$, $q_j$, or more precisely the absolute value of the difference in the gradients $|dx_j-dx_{j-1}|$ or $|dy_j-dy_{j-1}|$, in a rough trajectory nodal point $Q_j$ must be small in order to obtain the desired gentle transitions.

Since a respective drive device is assigned to each dimension x, y, the dimensions x, y may be mutually independently considered. The calculation steps are described below solely on the basis of the x component. The y and optionally z components are ascertained in corresponding manner.

The condition, according to which the change in gradient between two adjacent rough trajectory portion functions $q_{j-1}$, $q_j$ should be small, may be equivalently expressed for example in that a function $$f(x) = \frac{1}{2}\sum_{j=1}^{n}(dx_j - dx_{j-1})^2$$

should be minimised. This corresponds to a least squares method. After a number of transformations, the function f(x) may be expressed as $$f(x) = \tfrac{1}{2}x^T Q x,$$

wherein Q is a sparsely populated, symmetrical and positive semidefinite band matrix which accommodates reciprocal items of length information si and x denotes a vector $x=(x_0, \ldots, x_{n+1})^T$ of the individual components.

As a constraint for solving this optimisation problem, the rough trajectory nodal points $Q_j$, $j=0, \ldots, n+1$ must be situated within a specified window with edge length $\Delta$ around a respective associated contour nodal point $P_j$. This may be expressed by the condition $\|Q_j - P_j\|_\infty \leq \Delta$ or by the conditions:

$$|x_j - x_j^0| \leq \Delta, j=0, \ldots, n+1,$$

$$|y_j - y_j^0| \leq \Delta, j=0, \ldots, n+1,$$

wherein $\Delta$ as a rule correlates with the displacement limits of the high-dynamic fine drive. On travelling along the contour, the drive devices should start at contour nodal point $P_0$ and finish at contour nodal point $P_{n+1}$. The problem thus consists in locating points $xi_j, j=0, \ldots, n+1$ which minimise the function f(x) below the stated constraints. This problem may be written as $$f(x) = \tfrac{1}{2}x^T Q x \to \min$$

$$x_0 = x_0^0$$

$$x_j^0 - \Delta \leq x_j \leq x_j^0 + \Delta$$

$$x_{n+1} = x_{n+1}^0$$

which is known as a quadratic optimisation problem or quadratic program.

Numerous rapid methods for solving this optimisation problem are known to a person skilled in the art. Numerical methods such as gradient methods, active set methods, inner point methods or the class of Krylov subspace methods, in particular conjugate gradient methods, may be mentioned by way of example.

Once the rough trajectory nodal points $Q_0$, $Q_{j+1}$ have been ascertained in this manner, the rough trajectory portion functions $q_0$ to $q_j$ may be determined by connecting adjacent rough trajectory nodal points $Q_j$, $Q_{j+1}$ with straight lines (corresponding to a first order spline interpolation) or by third or higher order spline interpolation.

Figure 2:
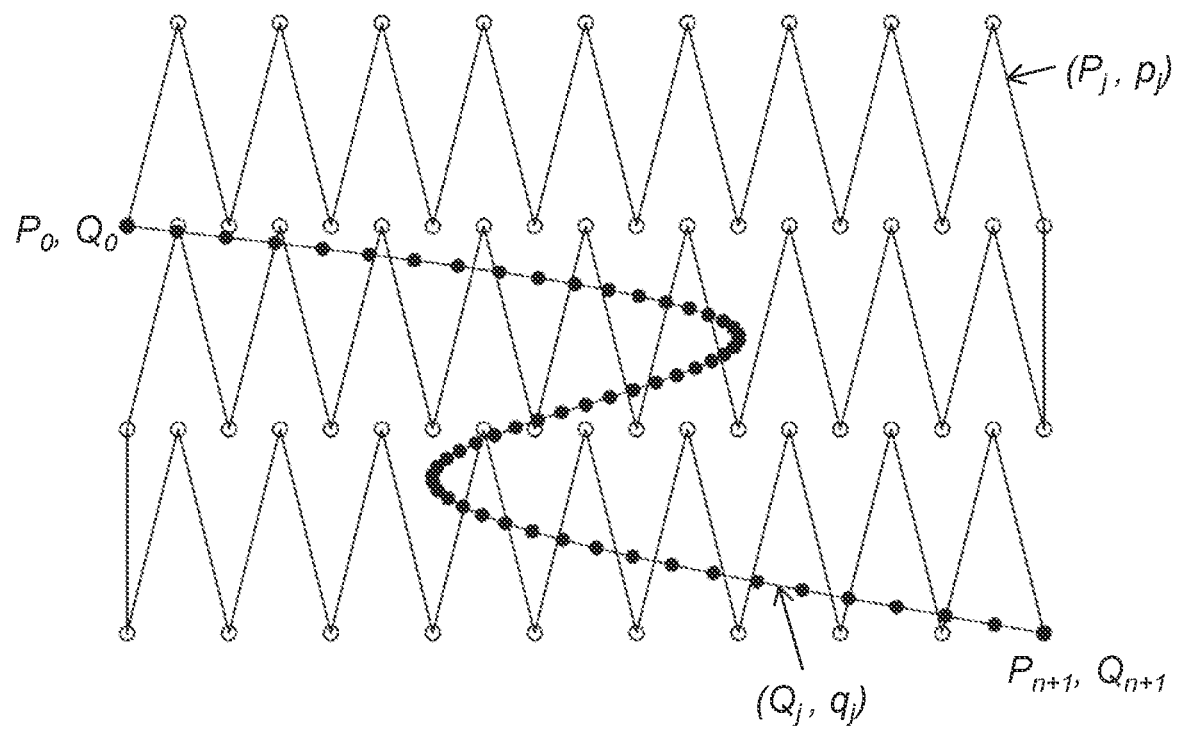
Figure 3:
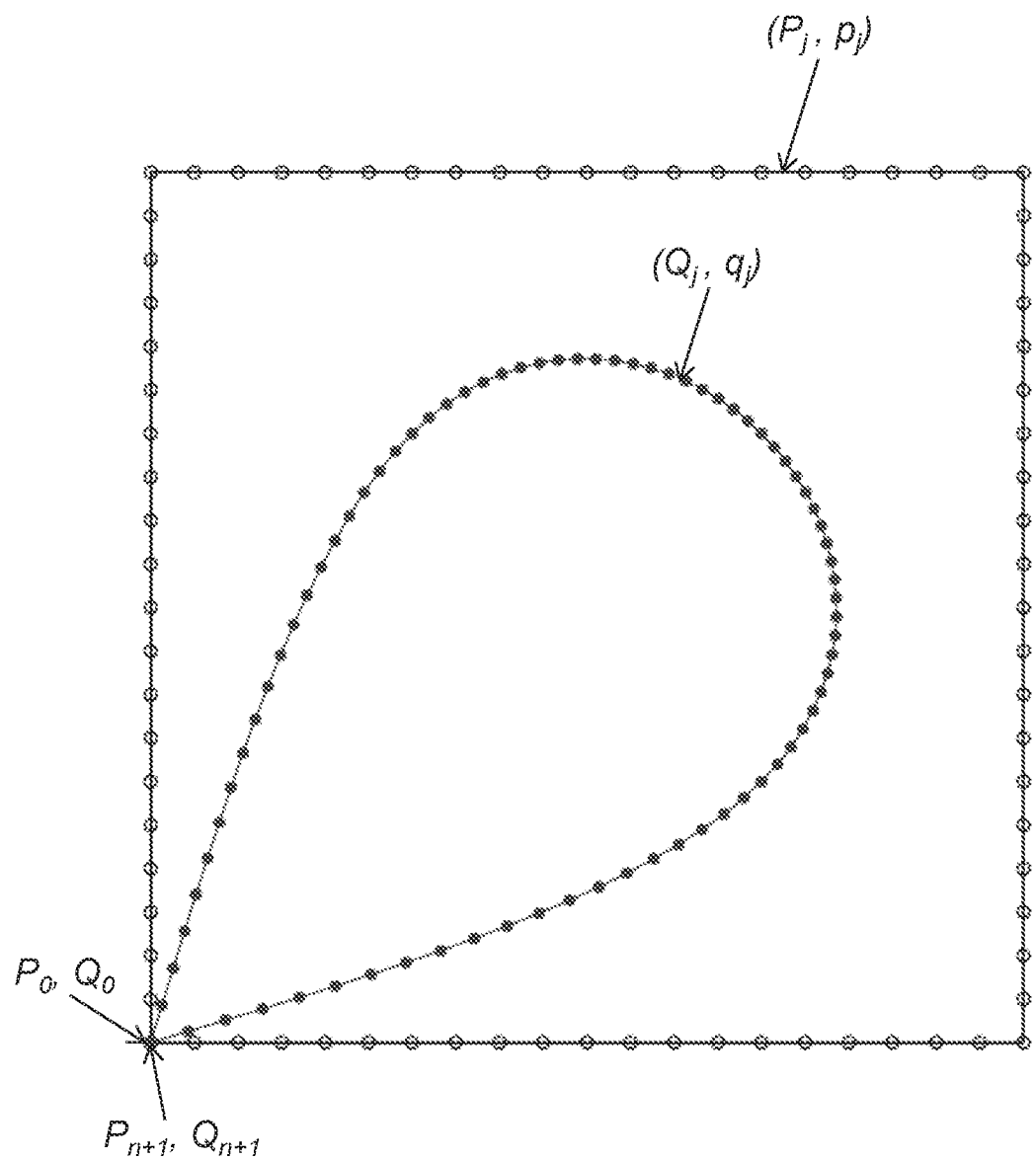

FIGS. 1 to 3 in each case show exemplary contour functions ($P_j$, $p_j$) with starting points $P_0$ and end points $P_{n+1}$ together with the rough trajectory functions ($Q_j$, $q_j$) ascertained by the method according to the invention as well as the associated starting points $Q_0$ and end points $Q_{n+1}$.

Figure 4:
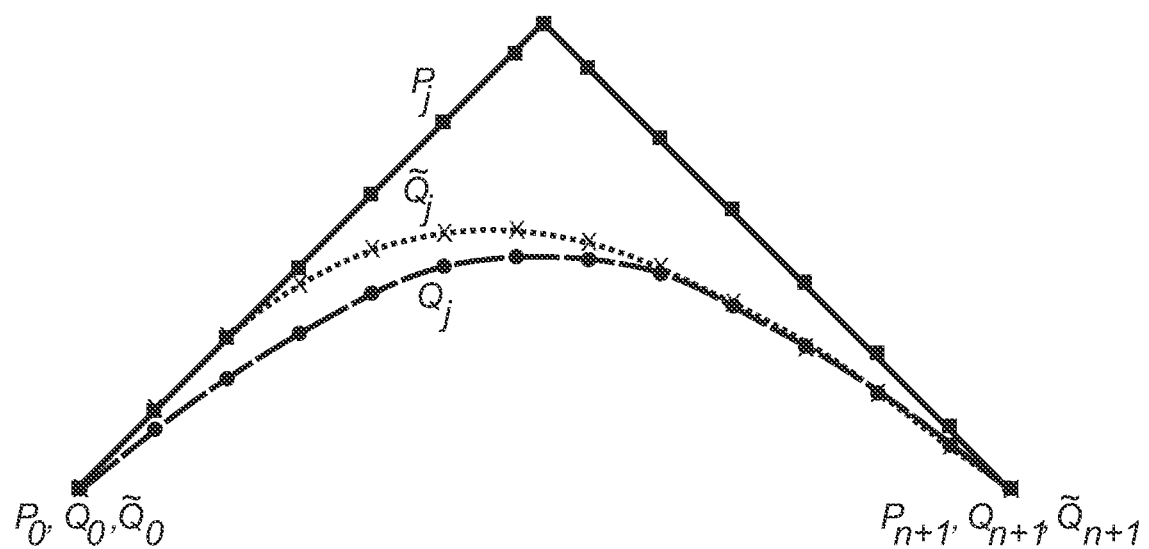

FIG. 4 shows an example of a rough trajectory determination similar to FIG. 1. On the basis of the contour functions ($P_j$, $p_j$) represented by a continuous line, all the contour functions up to index n may be transformed into a rough trajectory ($Q_j$, $q_j$) shown in dashed lines by individual application of the method. This is already depicted in FIG. 1.

On iterative application of the method, the contour function may be subdivided into subportions k to $n_k$ with $n_k=k+1, \ldots, n$ and k<n, wherein the respective highest index value $n_k$ satisfies a distance condition $2\Delta$. The size of the respective rough contour portion may be selected such it corresponds to an entire movement space of the high-dynamic drive. Starting from a starting point $P_k$ for defining $n_k$ for the set of contour points to be considered of the respective rough contour portion, the following therefore applies:

$$\|P_{nk} - P_k\|_\infty > 2\Delta$$

For the first iteration, contour points $P_0$ to $P_{n0+1}$ are considered, i.e. k=0 and the index value n0 which just corresponds to the distance condition with distance $2\Delta$ from point $P_0$ to point $P_{n0}$ is sought. Initial rough trajectory points $Q_0$ to $Q_{n0+1}$ are determined therefrom by applying the method.

For each further iteration, k:=k+1 is set and the maximum index $n_k$ with nk=k+1, ..., n is in turn sought, wherein the subsequent rough trajectory portion is displaced by an index value distance of 1, i.e. k:=k+1 is calculated. Rough trajectory points from 1 to n1 are accordingly determined for the second iteration and points j to nj for subsequent iterations j, wherein the rough points $Q_{k-1}$, $Q_k$ of the preceding rough contour portion are in each case used as the starting point(s) of each rough contour portion, and otherwise contour points $P_k+1$ to $P_{k+1}$ are considered. The first rough point(s) of the previously calculated rough contour portion are thus introduced, remaining unchanged, into each subsequent rough contour portion, wherein the index window in each case shifts by an index value k:=k+1. Ultimately, in each subsequent iteration, since the index value k is increased by 1, only one further rough trajectory point is added until nk=n. The method may be applied at most n-times. Because at least the first, preferably the first two, rough trajectory points, or a plurality of first rough trajectory points of the preceding portion is/are used as starting points for the subsequent portion, it is possible to ensure that, on transition from one rough contour portion to the next, the rough trajectory gradient in the transitional zone is minimised.

The rough trajectory curve obtained from the iterative method with rough trajectory points $\overline{Q}_j$ is shown in dash-dotted lines and compared with rough trajectory points $Q_j$ obtained by just one-off application of the method to all points $P_0$ to $P_{n+1}$, see FIG. 1. It is clear that an improved approximation to the starting contour may be achieved, wherein an increased number of iterations is required on a reduced number of contour points.

The invention claimed is:

1. A method for controlling a machine tool having at least two mutually redundant drive devices for carrying out superimposed movements following a contour function, the method comprising:
   determining a specified contour for controlling the machine tool by the contour function defined in portions by contour nodal points (P0 to Pn+1) and respective contour portion functions (p0 to pn), wherein a respective contour portion function (pj) connects two adjacent contour nodal points (Pj, Pj+1) of the contour nodal points (P0 to Pn+1);
   determining a rough trajectory by a rough trajectory function (Qj, qj) which is defined in portions by rough trajectory nodal points (Q0 to Qn+1) and respective rough trajectory portion functions (q0 to qn), wherein a respective rough trajectory portion function (qj) connects two adjacent rough trajectory nodal points (Qj, Qj+1) of the rough trajectory nodal points (Q0 to Qn+1);
   ascertaining, for each of the contour nodal points (Pj), a respective assigned rough trajectory nodal point (Qj) of the rough trajectory nodal points (Q0 to Qn+1) such that a difference in gradients of the two adjacent rough trajectory portion functions (qj−1, qj) which contain the respective assigned rough trajectory nodal point (Qj) is minimal and that a distance of the contour nodal point (Pj) from the respective assigned rough trajectory nodal point (Qj) satisfies a specified distance condition; and
   directing the movement of one of the at least two mutually redundant drive devices based on the respective assigned rough trajectory nodal point (Qj).

2. The method of claim 1, wherein the specified distance condition requires that the distance between the contour nodal point ($P_j$) and the assigned rough trajectory nodal point ($Q_j$) is less than or equal to a predetermined limit value ($\Delta$).

3. The method of claim 2, wherein the predetermined limit value ($\Delta$) corresponds to a respective maximum displacement of one of the drive devices.

4. The method of claim 3, wherein the contour function ($P_j$, $p_j$) is defined in a plurality of dimensions such that according to a distance condition, the distance between the contour nodal point ($P_j$) and the assigned rough trajectory nodal point ($Q_j$) is less than or equal to a predetermined limit value ($\Delta$), where the distance condition requires that in each of the dimensions the distance is less than or equal to the predetermined limit value ($\Delta$).

5. The method of claim 4, wherein the predetermined limit value ($\Delta$) of each of the dimensions is equal for all the dimensions.

6. The method of claim 5, wherein the ascertaining the respective assigned rough trajectory nodal point ($Q_j$) for each of the contour nodal points ($P_j$) requires that the respective assigned rough trajectory nodal points ($Q_j$) for which a sum of all squared differences between the gradients of the two adjacent rough trajectory portion functions ($q_{j-1}$, $q_j$) of the rough trajectory function ($Q_j$, $q_j$) is minimal are ascertained.

7. The method of claim 6, wherein the contour function ($P_j$, $p_j$) is defined in a plurality of dimensions such that the ascertaining the respective assigned rough trajectory nodal points ($Q_j$) for which the sum of all the squared differences between the gradients of the two adjacent rough trajectory portion functions ($q_{j-1}$, $q_j$) of the rough trajectory function ($Q_j$, $q_j$) is the minimal requires that coordinates of the respective assigned rough trajectory nodal points ($Q_j$) are separately ascertained in each of the dimensions.

8. The method of claim 7, wherein the rough trajectory portion functions ($q_0$ to $q_n$) are formed by respective linear functions.

9. The method of claim 8, wherein the rough trajectory portion functions ($q_0$ to $q_n$) are generated via a spline interpolation of the rough trajectory nodal points ($Q_0$ to $Q_{n+1}$).

10. The method of claim 9, wherein a first rough trajectory portion of rough trajectory nodal points ($Q_0$ to $Q_{n0+1}$) and respective rough trajectory portion functions ($q_0$ to $q_{n0}$) is determined in a first iteration with regard to a distance condition ($2\Delta$) from the starting point $P_0$ to $P_{n0+1}$, with n0<n and k=0, and in subsequent iterations with k>0 further rough trajectory portions of rough trajectory nodal points ($Q_k$ to $Q_{nk+1}$) and respective rough trajectory portion functions ($q_k$ to $q_{nk}$) with nk=k+1, ..., n and k<n are determined with regard to the distance condition ($2\Delta$) between contour nodal points $P_k$ to $P_{nk+1}$, until nk=n, wherein at least the rough trajectory point $Q_k$, preferably at least the two rough trajectory points $Q_{k-1}$, $Q_k$, are set as a starting point for a subsequent iteration.

11. The method of claim 10, wherein, for the iterative calculation of subsequent rough trajectory portions of the further rough trajectory nodal points ($Q_k$ to $Q_{nk+1}$) and respective rough trajectory portion functions ($q_k$ to $q_{nk}$), an index k is shifted by 1 and thus k:=k+1 applies for a subsequent iteration.

12. A system for controlling a machine tool, the system comprising:
   the machine tool comprising at least two mutually redundant drive devices for carrying out superimposed movements following a contour curve; and
   a computer numerical control (CNC) device configured to:
      determine a specified contour for controlling the machine tool by the contour function defined in portions by contour nodal points ($P_0$ to $P_{n+1}$) and respective contour portion functions ($p_0$ to $p_n$), wherein a respective contour portion function ($p_j$) connects two adjacent contour nodal points ($P_j$, $P_{j+1}$) of the contour nodal points ($P_0$ to $P_{n+1}$),
      determine a rough trajectory by a rough trajectory function ($Q_j$, $q_j$) which is defined in portions by rough trajectory nodal points ($Q_0$ to $Q_{n+1}$) and respective rough trajectory portion functions ($q_0$ to $q_n$), wherein a respective rough trajectory portion function ($q_j$) connects two adjacent rough trajectory nodal points ($Q_j$, $Q_{j+1}$) of the rough trajectory nodal points ($Q_0$ to $Q_{n+1}$),
      ascertain, for each of the contour nodal points ($P_j$), a respective assigned rough trajectory nodal point ($Q_j$) of the rough trajectory nodal points ($Q_0$ to $Q_{n+1}$) such that a difference in gradients of the two adjacent rough trajectory portion functions ($q_{j-1}$, $q_j$) which contain the respective assigned rough trajectory nodal point ($Q_j$) is minimal and that a distance of the contour nodal point ($P_j$) from the respective assigned rough trajectory nodal point ($Q_j$) satisfies a specified distance condition, and
      direct the movement of one of the at least two mutually redundant drive devices based on the respective assigned rough trajectory nodal point ($Q_j$).

13. The system of claim 12, wherein the specified distance condition requires that the distance between the contour nodal point ($P_j$) and the assigned rough trajectory nodal point ($Q_j$) is less than or equal to a predetermined limit value ($\Delta$).

14. The system of claim 13, wherein the predetermined limit value ($\Delta$) corresponds to a respective maximum displacement of one of the drive devices.

15. The system of claim 12, wherein the contour function ($P_j$, $p_j$) is defined in a plurality of dimensions such that according to a distance condition, the distance between the contour nodal point ($P_j$) and the assigned rough trajectory nodal point ($Q_j$) is less than or equal to a predetermined limit value ($\Delta$), where the distance condition requires that in each of the dimensions the distance is less than or equal to the predetermined limit value ($\Delta$) for the dimension.

16. The system of claim 15, wherein the predetermined limit value ($\Delta$) of each of the dimensions is equal for all the dimensions.

17. The system of claim 12, wherein the ascertaining the respective assigned rough trajectory nodal point ($Q_j$) for each of the contour nodal points ($P_j$) requires that the respective assigned rough trajectory nodal points ($Q_j$) for which a sum of all squared differences between the gradients of the two adjacent rough trajectory portion functions ($q_{j-1}$, $q_j$) of the rough trajectory function ($Q_j$, $q_j$) is minimal are ascertained.

18. The system of claim 17, wherein the contour function ($P_j$, $p_j$) is defined in a plurality of dimensions such that the ascertaining the respective assigned rough trajectory nodal points ($Q_j$) for which the sum of all the squared differences between the gradients of the two adjacent rough trajectory portion functions ($q_{j-1}$, $q_j$) of the rough trajectory function ($Q_j$, $q_j$) is the minimal requires that coordinates of the respective assigned rough trajectory nodal points ($Q_j$) are separately ascertained in each of the dimensions.

19. The system of claim 12, wherein the rough trajectory portion functions ($q_0$ to $q_n$) are formed by respective linear functions.

20. The system of claim 12, wherein the rough trajectory portion functions ($q_0$ to $q_n$) are generated via a spline interpolation of the rough trajectory nodal points ($Q_0$ to $Q_{n+1}$).

21. The system of claim 12, wherein a first rough trajectory portion of rough trajectory nodal points ($Q_0$ to $Q_{n0+1}$) and respective rough trajectory portion functions ($q_0$ to $q_{n0}$) is determined in a first iteration with regard to a distance condition ($2\Delta$) from the starting point $P_0$ to $P_{n0+1}$, with n0<n and k=0, and in subsequent iterations with k>0 further rough trajectory portions of rough trajectory nodal points ($Q_k$ to $Q_{nk+1}$) and respective rough trajectory portion functions ($q_k$ to $q_{nk}$) with nk=k+1, . . . , n and k<n are determined with regard to the distance condition ($2\Delta$) between contour nodal points $P_k$ to $P_{nk+1}$, until nk=n, wherein at least the rough trajectory point $Q_k$, preferably at least the two rough trajectory points $Q_{k-1}$, $Q_k$, are set as a starting point for a subsequent iteration.

22. The system of claim 21, wherein, for the iterative calculation of subsequent rough trajectory portions of the further rough trajectory nodal points ($Q_k$ to $Q_{nk+1}$) and respective rough trajectory portion functions ($q_k$ to $q_{nk}$), an index k is shifted by 1 and thus k:=k+1 applies for a subsequent iteration.

* * * * *